United States Patent
Bauvin et al.

(10) Patent No.: US 9,073,384 B2
(45) Date of Patent: Jul. 7, 2015

(54) SYSTEM FOR AFFIXING A PATTERN ONTO A SUBSTRATE, AND CORRESPONDING METHOD

(75) Inventors: Antoine Emile Andre Marie Bauvin, Nibas (FR); Christophe Jean Wagner, Neuville les Dieppe (FR)

(73) Assignee: SGD S.A., Puteaux (FR)

( * ) Notice: Subject to any disclaimer, the term of this patent is extended or adjusted under 35 U.S.C. 154(b) by 0 days.

(21) Appl. No.: 13/387,875

(22) PCT Filed: Jul. 27, 2010

(86) PCT No.: PCT/FR2010/051582
§ 371 (c)(1),
(2), (4) Date: Apr. 2, 2012

(87) PCT Pub. No.: WO2011/015765
PCT Pub. Date: Feb. 10, 2011

(65) Prior Publication Data
US 2012/0175037 A1    Jul. 12, 2012

(30) Foreign Application Priority Data
Jul. 29, 2009  (FR) .................................. 09 55324

(51) Int. Cl.
| | |
|---|---|
| *B44C 1/16* | (2006.01) |
| *B44C 1/18* | (2006.01) |
| *B44C 1/28* | (2006.01) |
| *B44C 5/00* | (2006.01) |
| B32B 37/00 | (2006.01) |
| A45D 34/00 | (2006.01) |

(52) U.S. Cl.
CPC .............. *B44C 1/162* (2013.01); *Y10T 156/10* (2015.01); *Y10T 156/17* (2015.01); *B32B 37/025* (2013.01); *Y10T 156/1707* (2015.01); *A45D 2034/007* (2013.01); *B44C 1/18* (2013.01); *B44C 1/28* (2013.01); *B44C 5/00* (2013.01)

(58) Field of Classification Search
CPC ............. B44C 1/18; B44C 1/16; B44C 1/162; B44C 1/1708; B44C 1/28; B44C 5/00; B44C 5/04; B44C 5/0407; Y10T 156/10; Y10T 156/17; Y10T 156/1705; Y10T 156/1707; A45D 2034/007; B23P 19/10; B23P 19/12; B23P 21/002; B23P 21/004; B32B 7/025
USPC ............ 29/464, 465, 466, 719, 744; 100/917; 156/272.2, 272.4, 363, 580, 581, 156/583.1, 583.3, 583.5, 230–241, 156/540–542, 580.1; 269/8
See application file for complete search history.

(56) References Cited

U.S. PATENT DOCUMENTS 4,564,414 A * 1/1986 Houssian et al. .............. 156/541
5,458,715 A * 10/1995 Takeuchi et al. .............. 156/241
(Continued)

*Primary Examiner* — John Goff
*Assistant Examiner* — Hannuri L Kwon
(74) *Attorney, Agent, or Firm* — Pearl Cohen Zedek Latzer Baratz LLP

(57) ABSTRACT

The invention relates to a system (1) for affixing a pattern (2) onto a substrate (3), said system (1) including a transfer means (4) to which said pattern (2) is attached, and a pressing means (5), said system (1) being characterized in that it includes a means (6) for aiding in the positioning of the pattern (2) relative to the substrate (3), said aiding means (6) including a first member (7) rigidly connected to the substrate (3) or to the pressing means (5) and a second member (9) rigidly connected to the transfer means (4), said first and second members (7, 9) being designed in such that engagement is established therebetween that prevents the possibility of the members moving away from each other. The invention can be used for depositing decorative and/or functional elements onto a substrate.

8 Claims, 1 Drawing Sheet

(56) References Cited

U.S. PATENT DOCUMENTS

| | | |
|---|---|---|
| 7,290,580 B2 * | 11/2007 | Naitoh et al. ............... 156/581 |
| 2001/0010851 A1 * | 8/2001 | Kita et al. ................ 428/64.1 |
| 2008/0218299 A1 * | 9/2008 | Arnold ......................... 335/306 |
| 2009/0023250 A1 * | 1/2009 | Speckels et al. ............. 438/118 |
| 2009/0251242 A1 * | 10/2009 | Fullerton et al. ............. 335/209 |

* cited by examiner

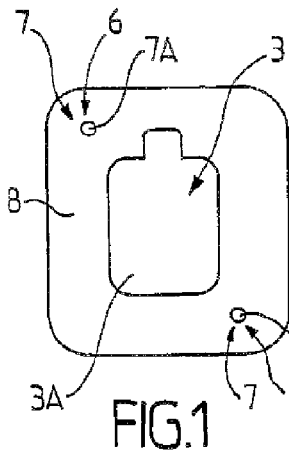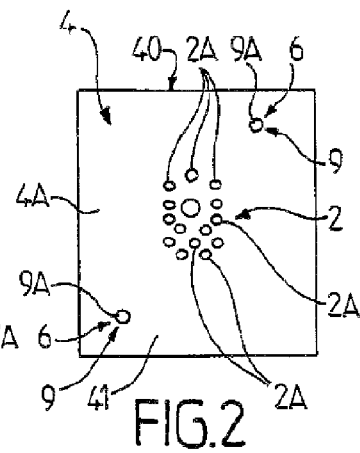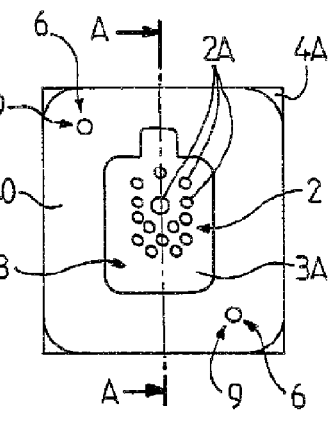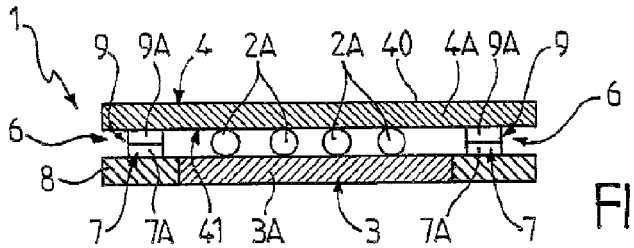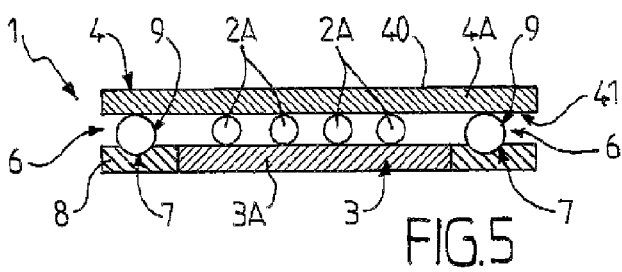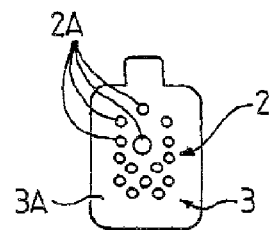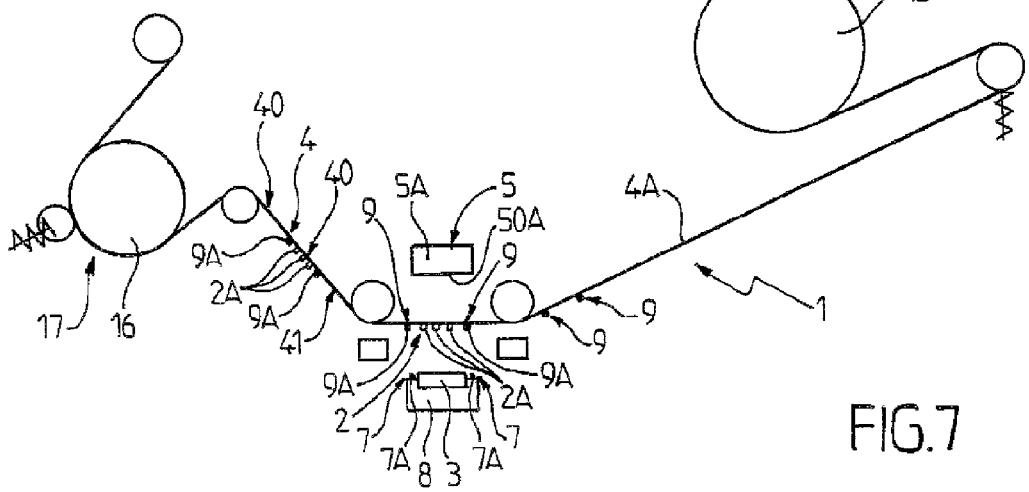

SYSTEM FOR AFFIXING A PATTERN ONTO A SUBSTRATE, AND CORRESPONDING METHOD

CROSS-REFERENCE TO RELATED APPLICATIONS

This application is a National Phase Application of PCT International Application No. PCT/FR2010/051582, International Filing Date Jul. 27, 2010, claiming priority of French Patent Application No. 0955324, filed Jul. 29, 2009.

The present invention relates to the general technical field of depositing decorative and/or functional elements onto a substrate, and in particular of decorating glass vials by transfer of patterns onto the latter, and in particular of patterns that are themselves made of glass.

The present invention relates to a system for affixing a pattern at a unique predetermined location on a substrate, said system comprising, on the one hand, a transfer means to which said pattern is removably attached, and on the other hand, a pressing means for pressing against the substrate the transfer means and the pattern attached to the latter.

The present invention also relates to a method for manufacturing a substrate onto which is affixed a pattern, at a unique predetermined location, said method comprising, on the one hand, a step of making or providing a transfer means to which said pattern is removably attached, and on the other hand, a step of pressing, against the substrate, the transfer means and the pattern attached to the latter, said step of pressing being carried out using a pressing means.

The present invention finally relates to a transfer sub-assembly for affixing a pattern onto a substrate, said transfer sub-assembly comprising a transfer means to which said pattern is removably attached.

It is known to apply decorative patterns on substrates by transfer. Such a transfer method generally implements a transfer film to which the pattern to be applied is removably attached by one of its faces, for example using an adhesive substance. Another face of the pattern is coated with a layer of activatable adhesive, for example a layer of hot-melt glue. The transfer film and the pattern attached to the latter are intended to be pressed against the surface of the substrate to be decorated, in the presence of heat supply activating the hot-melt glue. The pattern is therefore stuck to the substrate, and then it just remains to peel off the transfer film to obtain a finite object, consisted of the substrate coated with the pattern.

Such conventional method generally gives satisfaction, but it nevertheless suffers from some serious drawbacks, in particular when implemented in industrial context, and especially within the framework of the manufacturing of luxury goods.

Therefore, the implementation of the prior art transfer methods generally requires extensive human intervention, in order notably to ensure the correct positioning of the transfer film relative to the decorated substrate. Indeed, a non-optimal positioning may lead to a final object whose visual aspect is not satisfying. It applies particularly in the luxury sector, for example in the perfume sector, in which the elements of decoration must be made in an extremely accurate and irreproachable manner to fulfill the customers' expectations. Therefore, any insufficiently accurate positioning of a pattern on a luxury object leads to the disposal of this decorated object, which represents non-negligible costs, in particular in the case of heavy valuable objects such as glass perfume vials.

Moreover, such need for an accurate positioning of the transfer pattern makes it essential to use a transparent transfer film, so that the manufacturing operator can rigorously control the positioning. This obviously creates an additional constraint, which may have an influence notably on the manufacturing cost, without even so offering an absolute guarantee as for the positioning accuracy, which depends above all on the manufacturing operator.

Finally, the known methods of decoration by transfer do not make it possible to obtain a perfectly satisfying result by a cheap industrial process.

Therefore, the objects assigned to the present invention aim to remedy the different above-listed drawbacks and to propose new system and method for affixing a pattern onto a substrate, at a unique predetermined location, which make it possible to industrially affix the pattern onto the substrate by transfer, in an extremely rapid, accurate, simple and cheap way.

Another object of the invention aims to propose new system and method for affixing a pattern onto a substrate, at a unique predetermined location, which can be easily automated.

Another object of the invention aims to propose new system and method for affixing a pattern onto a substrate, at a unique predetermined location, which are based on extremely simple and reliable principles.

Another object of the invention aims to propose new system and method for affixing a pattern onto a substrate, at a unique predetermined location, which implement a minimum number of different components.

Another object of the invention aims to propose new system and method for affixing a pattern onto a substrate, at a unique predetermined location, which make it possible to obtain high automated manufacturing rates.

The objects assigned to the present invention are achieved by means of a system for affixing a pattern at a unique predetermined location on a substrate, said system comprising, on the one hand, a transfer means to which said pattern is removably attached, and on the other hand, a pressing means for pressing against the substrate the transfer means and the pattern attached to the latter, said system being characterized in that it comprises a means for aiding in the positioning of the pattern at said unique predetermined location on the substrate, said positioning aiding means comprising a first member mounted integral with the substrate or with the pressing means and a second member mounted integral with the transfer means, said first and second members being designed in such a manner that a cooperation is established between them when they are brought into correspondence with each other, preventing them from moving away from each other.

The objects assigned to the invention are also achieved by means of a method for manufacturing a substrate on which a pattern is affixed at a unique predetermined location, said method comprising, on the one hand, a step of making or providing a transfer means to which said pattern is removably attached, and on the other hand, a step of pressing, against the substrate, the transfer means and the pattern attached to the latter, said step of pressing being carried out using a pressing means, said method being characterized in that it comprises a step of making a means for aiding in the positioning of the pattern at said predetermined location on the substrate, step during which a first and a second members forming said positioning aiding means are respectively mounted integral with the substrate or with the pressing means on the one hand, and with the transfer means on the other hand, said first and second members being designed in such a manner that a cooperation is established between them when they are brought in correspondence with each other, preventing them from moving away from each other, the method also comprising, before the step of pressing, a step of bringing the first and second members into correspondence with each other so that said cooperation between them is established.

FIG. 7 illustrates a system according to the invention in which the transfer film runs, thanks to a system of winding/unwinding rolls, opposite a substrate to be decorated.

According to a first aspect, the invention relates to a system 1 for affixing a pattern 2 at a unique predetermined location on a substrate 3, such that the substrate 3 is covered with the pattern 2, the latter being attached to the surface of the substrate 3. Therefore, within the framework of the invention, a given pattern 2 has to be transferred at a particular location on the substrate 3, and only at this location, to obtain the desired decorative effect (and/or functional effect).

Preferably, the substrate 3 is glass-based, and even more preferably comprises a vial 3A, preferably made of glass, and for example a glass vial intended to contain perfume. Preferably, the pattern 2 comprises a plurality of elements 2A, which are preferably protruding elements. Preferentially, as illustrated in the figures, the pattern 2 thus comprises a plurality of beads, preferably made of glass.

According to the invention, the system 1 comprises a transfer means 4 to which the pattern 2 is removably attached.

The transfer means 4 is for example formed by a transfer film 4A. Therefore, in the examples illustrated in the figures, the pattern 2 comprises a plurality of elements 2A removably attached to a transfer film A4 forming the transfer means 4. Such a transfer film is well known as such. It may for example be in the form of a flexible or rigid plate, possibly transparent to facilitate the transfer operations. In the example of FIGS. 1 to 5, the transfer film 4A is in the form of a flexible plate, substantially rectangular in shape, made of a transparent plastic material, it being understood that the use of a transparent material is purely optional. In the embodiment of FIG. 7, the transfer film A4 is in the form of a flexible material ribbon designed so as to run between a winding roll 15 and an unwinding roll 16.

Conventionally, the pattern 2, i.e. herein the plurality of elements 2A forming it, are stuck to the surface of the transfer film 4A. The free face of the pattern 2, herein formed by the free faces of the elements 2A, is coated with a glue that is activatable, for example sensitive to heat and/or pressure, or non-activatable (self-adhesive).

The principle of transfer implemented within the framework of the

The objects assigned to the invention are also achieved by means of a transfer sub-assembly for affixing a pattern onto a substrate, said transfer sub-assembly comprising a transfer means to which said pattern is removably attached and being characterized in that it comprises a second member mounted directly integral with the transfer means, said second member comprising a magnet or a ferromagnetic element and being a part of a means for aiding in the positioning of the pattern relative to the substrate, said aiding means further comprising a first member mounted integral either with a support receiving the substrate, or with a pressing means for pressing against the substrate the transfer means and the pattern attached to the latter, said first and second members being designed in such a manner that a cooperation is established between them when they are brought into correspondence with each other, preventing them from moving away from each other.

Other objects, features and advantages of the invention will be better understood by the following description, with reference to the appended drawings, given only by way of illustrative and non-limitative example, and in which:

FIG. 1 schematically illustrates a support provided with a housing receiving a substrate (herein a glass vial), onto which a pattern is intended to be affixed at a unique predetermined location;

FIG. 2 schematically illustrates a transfer sub-assembly according to the invention comprising, on the one hand, a transfer film to which is attached a pattern consisted of a plurality of glass beads, and on the other hand, two magnets attached to the transfer film and being a part of a means for aiding in the positioning of the pattern relative to the substrate;

FIG. 3 schematically illustrates the cooperation of the transfer film of FIG. 2 with the support/substrate sub-assembly of FIG. 1, in order to transfer the pattern carried by the film onto the substrate;

FIG. 4 is a schematic cross-sectional view of FIG. 3;

FIG. 5 is a schematic cross-sectional view of an alternative embodiment of the invention;

FIG. 6 schematically illustrates a glass vial covered with a pattern made of glass beads obtained at the end of a method according to the invention; invention is advantageously as follows:

The transfer means 4 to which the pattern 2 is attached is pressed against the substrate 3, so that the pattern 2 is interposed between the substrate 3 on the one hand and the transfer means 4 on the other hand (cf. FIGS. 4 and 5).

Under effect of the pressure exerted and/or of heat supply, the glue (which is preferably a hot-melt glue, as those used in the methods of the "hot-fix" type) located on the free face of the pattern 2, which is thus at the interface between the substrate 3 and the pattern 2, becomes sticky. The elements 2A, forming the pattern 2, are thus stuck to the substrate on the one hand, and to the transfer means 4 on the other hand.

Then, a peeling effort on the transfer means 4 is just needed to peel off the latter from the sub-assembly now formed by the substrate 3 and the pattern 2 stuck to the substrate 3.

A finite product is thus obtained, which consists, as illustrated in FIG. 6, of a substrate 3 decorated by a pattern 2.

In order to press the transfer means 4 against the substrate 3, the system 1 according to the invention comprises a pressing means 5 (cf. FIG. 7), to press against the substrate 3 the transfer means 4 and the pattern 2 attached to the latter. Advantageously, the pressing means 5 comprises a pad 5A provided with a planar face 50A intended to exert a pressure against the external face 40 of the transfer means 4, which is opposite to the internal face 41 to which the elements 2A forming the pattern 2 are attached. The pressing means 5 may comprise an automatic operating means (for example of the mechanical, automatic and/or electric type) or it may be operated manually. In a simplified alternative embodiment, the pressing means 5 may be consisted directly by the transfer means 4 itself, on which the user may exert a manual pressure to operate the transfer of the pattern 2 from the transfer means 4 toward and onto the substrate 3. In the exemplary embodiment, the pressing means 5 is a heating means, so as to heat the hot-melt glue that advantageously covers the free face of the pattern 2 and then to activate said glue. The activation of the glue may however be performed by any other means, and for example by irradiating the pattern 2 by an infrared radiation.

According to the invention, the system 1 comprises a means 6 for aiding in the positioning of the pattern 2 relative to the substrate 3. More precisely, the aiding means 6 is a means for aiding in the positioning of the pattern 2 at said unique predetermined location on the substrate 3. The aiding means 6 thus aids the user in positioning the pattern 2 at a single particular location on the substrate 3. In other words, the function of the aiding means 6 is to contribute to an optimum relative positioning of the pattern 2 onto the substrate 3, so that the pattern 2 is accurately affixed at a predetermined location on the substrate 3. For that purpose, the positioning aiding means 6 comprises a first member 7 mounted, directly or indirectly, integral with the substrate 3 or with the pressing means 5. In other words, the first member 7 forms with the substrate 3 or the pressing means 5 a unitary sub-assembly, i.e. the first member 7 is advantageously connected to the substrate 3 or to the pressing means 5 by a mechanical connection of the rigid-connection type, which preferably leaves no degree of freedom between the substrate 3 and the first member 7 (or between the pressing means 5 and the first member 7, according to the assembly chosen).

In the examples illustrated in the figures, the system 1 advantageously comprises a support 8 provided with a housing receiving the substrate 3. For example, the support 8 consists of a carriage in the surface of which is arranged an indentation whose shape is complementary of that of the substrate 3, the latter being formed by a glass vial in the examples illustrated in the figures. The substrate 3 is thus received in the support 8, and forms a unitary sub-assembly with the latter.

In this case, the first member 7 is advantageously integral with the support 8, which is itself integral with the substrate 3, as explained above. In this case, the first member 7 is thus mounted indirectly integral with the substrate 3, through the support 8. The first member 7 is secured to said support 8. However, it is perfectly conceivable that the first member 7 is mounted directly integral with the substrate 3 itself.

According to another embodiment mentioned hereinabove, it is also conceivable, by way of alternative, that the first member 7 is mounted, directly or indirectly, integral with the pressing means 5. The latter case is more specifically appropriate to a system in which the relative position of the pressing means 5 and the substrate 3 (or its support 8) is accurately and permanently established, thanks to the use of appropriate mechanical connection means between the pressing means 5 and the support 8, for example. In this case, the pressing means 5 is for example mounted on a frame (not shown), on which is also mounted the support 8.

The positioning aiding means 6 also comprises a second member 9 mounted, directly or indirectly, integral with the transfer means 4. Therefore, in the examples illustrated in the figures, the second member 9 is mounted directly integral with the transfer means 4, and more precisely, is attached to the internal face 41 of the transfer film 4A.

According to the invention, the first and second members 7, 9 are designed in such a manner that a cooperation is established between them when they are brought into correspondence with each other (i.e. they are placed opposite to each other, in a sufficient close position), preventing them from moving away from each other. In other words, the first and second members 7, 9 are designed to interact with each other when they are one against the other or near to each other, such interaction connecting the first and the second members 7, 9 so as to limit their ability to move relative to each other, and in particular to limit their ability to slide relative to each other in the plane parallel to the substrate 3 and to the transfer means 4. In order to facilitate the correct positioning of the pattern 2 onto the substrate 3, and then to fully fulfill its role of aid in positioning the pattern 2 at a unique predetermined location on the substrate 3, the aiding means 6 is designed so that said cooperation between said first and second members 7, 9 is not carried out permanently but only when the first and second members 7, 9 are one against the other and/or near to each other, so as to limit the intervention of the user in the reaching, by the pattern 2, of its unique predetermined location on the substrate 3.

In the embodiment illustrated in FIG. 4, the first and second members 7, 9 are designed so that the cooperation that is established between them when they are brought into correspondence with each other consists in a magnetic attraction. For that purpose, the first member 7 and the second member 9 each comprise at least one magnet and/or one ferromagnetic element 9A. In this case, the first member 7 comprises, for example, at least one magnet 7A whereas the second member 9 comprises at least one ferromagnetic element 9A. Obviously, it is perfectly conceivable that, conversely, the first member 7 comprises at least one ferromagnetic element and the second member 9 comprises at least one magnet, the essential being that the first and second members 7, 9 have complementary magnetic characters capable of generating an interaction between them. Therefore, in the embodiment illustrated in the figures, the support 8 is provided with two magnets 7A, which are for example stuck to its surface, whereas the transfer film 4A (and more precisely its internal face 41) is provided with two ferromagnetic elements 9A. Hence, it is then just needed to bring the magnets 7A and the ferromagnetic elements 9A into correspondence with each other, so that the ferromagnetic elements enter into the magnetic field of the magnets 9A, to generate an effect of accurate self-positioning of the transfer means 4 on the substrate 3 under the effect of the magnetic attraction establishing between the magnets 7A and the ferromagnetic elements 9A. The sub-assemblies formed the housing 8 and the substrate 3, on the one hand, and the transfer means 4 and the pattern 2, on the other hand, are therefore automatically brought, by a mutual attraction, in an accurate predetermined relative position, which ensures that the pattern 2 will be deposited at the correct location on the surface of the substrate 3.

In a particularly preferred embodiment, the first member 7 comprises at least one first magnet, whereas the second member 9 comprises at least one second magnet, said first and second magnets being designed to mutually attract each other when the first and second members 7, 9 are brought into correspondence with each other. The use of the cooperation between two magnets makes it possible to obtain a self-positioning and self-centering effect, insofar as the two magnets attract each other toward a unique mutual contact position, which constitute a unique return position.

Advantageously, the first member 7 comprises at least one first magnet and one third magnet, whereas the second member 9 comprises at least one second magnet and one fourth magnet, said first and second magnets being designed to mutually attract each other when said first and second members 7, 9 are brought into correspondence with each other, whereas said first and fourth magnets (and/or said second and third magnets) are designed to mutually repel each other when said first and second members 7, 9 are brought into correspondence with each other. For example, each of said first, second, third and fourth magnets have two opposite faces corresponding to the north pole and the south pole, respectively, of the magnet in question. The first magnet is in this case attached (directly or indirectly) to the substrate 3 or to the pressing means 5 by its first face (for example by being stuck to the support 8), in such a manner that its second face remains free, whereas the third magnet is attached (directly or indirectly) to the substrate 3 or to the pressing means 5 by its second face (for example by being stuck to the support 8), in such a manner that its first face remains free. Likewise, the second magnet is attached (directly or indirectly) to the transfer means 4 by its second face (for example by being stuck to the support 8), in such a manner that its first face remains free, whereas the fourth magnet is attached (directly or indirectly) to the transfer means 4 by its first face (for example by being stuck to the support 8), in such a manner that its second face remains free. Such arrangement avoid transferring the pattern 2 upside down onto the substrate 3, insofar as the free faces of the first and fourth magnets (like those of the second and third magnets) have opposite poles that repel each other and thus avoid a transfer of the pattern 2 in an inappropriate direction.

This embodiment implementing a magnetic attraction between either the substrate 3 and the transfer means 4, or the pressing means 5 and the transfer means 4, is particularly interesting in the case of a rolling system as illustrated in FIG. 7. In this embodiment, which is particularly advantageous from the industrial point of view because it is automatable, the system 1 comprises a device 17 for making the transfer film 4a run opposite the substrate 3, preferably by winding/unwinding of said transfer film 4A, for example between an unwinding roll 16 and a winding roll 15, as illustrated in FIG. 7. In this case, the transfer film 4A is in the form of a windable/unwindable strip on which patterns 2 are arranged at regular intervals. In this embodiment, the system 1 comprises a transfer station in which support carriages 8 run, each carriage carrying a substrate 3 to be decorated. In operation, the rolling device 17 makes it possible to present a pattern 2 opposite a blank substrate 3. This presentation operation is just to provide a rough positioning of the pattern 2 relative to the substrate 3, with the positioning only needing to be accurate enough so that the ferromagnetic elements (or magnets) 9A enter into the magnetic fields generated by the magnets 7A associated with the substrate 3 to be decorated. This arrangement provides an extremely rapid, accurate and automatic self-positioning of the transfer means 4 on the substrate 3, by mutual magnetic attraction. It is then just needed to proceed to the transfer operation by supplying pressure (using the pressing means 5) and possibly heat. Once the transfer operation is made and the vial accurately is decorated, the device 17 makes the transfer films 4A advance by one pitch (corresponding to the theoretical distance between two patterns 2), which has for effect to peel off the transfer film 4A from the pattern 2 affixed onto the substrate 3. It may possibly be provided an additional device aiding in the peeling off of the pattern 2 from the transfer means 4.

Therefore, the simple adding of a magnet/ferromagnetic element couple, or preferably magnet/magnet couple, makes it possible to obtain an extremely reliable, simple and cheap automated process, making it possible to obtain a particularly accurate positioning of the pattern 2 on the substrate 3. The invention thus makes it possible to provide time and quality savings, by avoiding the need for tedious and inaccurate manual operations.

According to an alternative embodiment, illustrated in FIG. 5, it is conceivable that the first and second members 7, 9 are designed in such a manner that a cooperation that is established between them when they are brought into correspondence with each other is of mechanical nature. For example, the first and second members 7, 9 have advantageously complementary male and female shapes. According to the embodiment illustrated in FIG. 5, the first member 7 is formed by two spherical-dome-shaped indentations arranged in the surface of the housing 8, whereas the second member 9 comprises two protruding studs, preferably of substantially spherical shape, attached (for example by being stuck) to the transfer means 4, and more precisely to the lower face 41 of the latter.

The protruding studs are hence intended to come and rest within and against the indentations provided in the housing 8 and forming the first member 7. This mechanical interaction produces a self-centering effect and limits the relative sliding of the transfer means 4 and the substrate 3 in the plane parallel to the substrate 3 and to the transfer means 4.

In a preferred alternative embodiment, the elements 2A forming the pattern 2 are protruding elements, and the second member 9 comprises a male element similar to said protruding elements 2A forming the pattern 2. Therefore, if the pattern 2 is consisted of a plurality of beads, the male elements forming the second member 9 can be consisted of one or more of these same beads. This is particularly advantageous regarding the simplicity of the manufacturing method, because the use of specific parts to form the second member 9 is not necessary in this case.

Generally, whatever is the conceived embodiment (mechanical or magnetic cooperation), the second member 9 may be secured to the transfer means 4 in the same way as the pattern 2 is secured to the transfer means 4. This arrangement has a certain advantage regarding simplicity and cost control.

It results of what precedes that the aiding means 6 is a means for aiding in automatic positioning of the pattern 2 at its unique predetermined location, because it allows the user to automatically find, by simply bringing (manually or mechanically) the first and second means 7, 9 into correspondence with each other, the unique predetermined position at which the pattern 2 has to be transferred onto the substrate. Consequently, advantageously, only one steady predetermined relative position exists in which a cooperation is established between the first and second members, holding said first and second members 7, 9 in said predetermined relative position.

The invention also relates as such to a method for manufacturing a substrate 3 onto which is affixed a pattern 2 at a unique predetermined location, said manufacturing method being capable of being implemented using the above-described system 1.

According to the invention, the method comprises a step of making or providing a transfer means 4 to which the pattern 2 to be affixed is removably attached.

Such a step of making or providing a transfer means 4 is well known as such, so it will not be described in more detail.

The method according to the invention also comprises a step of pressing, against the substrate 3, the transfer means 4 and the pattern 2 attached to the latter, said step of pressing being carried out using the pressing means 5.

Said method further comprises a step of making a means 6 for aiding in the positioning of the pattern 2 at said unique predetermined location on the substrate 3, step during which a first and a second members 7, 9 forming said positioning aiding means 6 are respectively mounted integral with the substrate 3 or with the pressing means 5 on the one hand, and with the transfer means 4 on the other hand. The first and second members 7, 9 are designed, as explained above, in such a manner that a cooperation is established between them when they are brought in correspondence with each other, preventing them from moving away from each other, in order to permit the reaching, by the pattern 2, of its predetermined transfer location, in an automatic and/or intuitive manner.

As above mentioned in relation with the description of the system 1, the method according to the invention also comprises, before the above-described step of pressing, a step of bringing the first and second members 7, 9 into correspondence with each other so that the cooperation in question is established. This step of bringing into correspondence consists in bringing the first and second members 7, 9 close enough so that either a magnetic interaction or a mechanical interaction (self-centering) occurs, wherein said cooperation can advantageously consists in a magnetic attraction or in a cooperation of mechanical nature, said cooperation occurring at a single relative position of the first and second members 7, 9, corresponding to the adequate position of transfer of the pattern 2 onto the substrate 3.

Preferably, the method of the invention is applied to a pattern 2 that itself comprises a plurality of elements 2A removably attached to a transfer film 4A forming the transfer means 4.

Particularly advantageously, the method comprises, as illustrated in FIG. 7 and as already described above, a step of running of the transfer film 4A opposite the substrate 3 by winding/unwinding said transfer film 4A until the first and second members 7, 9 are in correspondence with each other.

Particularly preferentially, the method is applied for a substrate 3 comprising a vial, preferably made of glass, whereas the pattern 2 comprises a plurality of beads, which are also preferably made of glass.

Therefore, the invention makes it possible to completely avoid the need for a visual control for the transfer of the pattern 2 onto the substrate 3, and this by means of simple and cheap means that permit an automation of the method.

The invention finally relates as such to a transfer sub-assembly 40 (illustrated in FIG. 2) for affixing a pattern 2 onto a substrate 3, preferably at a unique predetermined position on the latter, said transfer sub-assembly 40 comprising a transfer means 4 to which said pattern 2 is removable attached.

The transfer sub-assembly 40 also comprises a second member 9 mounted directly integral with the transfer means 4, said second member 9 being a part of a means 6 for aiding in the positioning of the pattern 2 relative to the substrate 3.

The aiding means 6 further comprises a first member 7 mounted integral either with a support 8 receiving the substrate 3, or with a pressing means 5 for pressing against the substrate 3 the transfer means 4 and the pattern 2 attached to the latter, said first and second members 7, 9 being designed in such a manner that a cooperation is established between them when they are brought into correspondence with each other, preventing them from moving away from each other, as explained above.

As described above, the second member 9 comprises at least one magnet or one ferromagnetic element 9A.

In a preferred alternative embodiment, the transfer sub-assembly 40 thus comprises, on the one hand, a transfer means 4 to which the pattern 2 to be transferred is removably attached, and on the other hand, at least one magnet or one ferromagnetic element 9A mounted integral with the transfer means 4 (for example directly attached to the latter) and intended to aid in the positioning of the pattern 2 relative to the substrate 3 through magnetic attraction with a ferromagnetic element or a magnet 7A mounted integral either with a support 8 receiving the substrate 3, or with a pressing means 5 for pressing against the substrate 3 the transfer means 4 and the pattern 2 attached to the latter.

The invention claimed is:

1. A system for affixing a pattern at a unique predetermined location on a substrate, said system comprising:
    a transfer film to which said pattern is removably attached;
    a press for pressing against the substrate the transfer film and the pattern attached to the transfer film; and
    a positioner for aiding in the positioning of the pattern at said unique predetermined location on the substrate, said positioner comprising a first member including at least one first magnet and one third magnet and mounted integrally with the substrate or with the press, and a second member including at least one second magnet and one fourth magnet mounted integrally with the transfer film, said first and second magnets being designed to mutually magnetically attract one another when said first and second members are brought into correspondence, and said first and fourth magnets or said second and third magnets being designed to mutually repel each other when said first and second members are brought into correspondence, so as to form a connection between said first and second members when said first and second members are brought into correspondence with each other, the connection preventing said first and second members from moving away from each other, the second member being designed to remain mounted integrally with the transfer film after transfer of the pattern from the transfer film to the substrate.

2. A system according to claim 1, wherein the system comprises a support provided with a housing receiving the substrate, said first member being secured to said support.

3. A system according to claim 1, wherein the pattern comprises a plurality of elements removably attached to the transfer film.

4. A system according to claim 3, comprising a device for making the transfer film pass opposite the substrate.

5. A system according to claim 1, wherein the press comprises a pad.

6. A system according to claim 1, wherein the substrate comprises a vial, and wherein the pattern comprises a plurality of beads.

7. A system according to claim 6, wherein the vial or the plurality of beads is made of glass.

8. A transfer sub-assembly for affixing a pattern onto a substrate, said transfer sub-assembly comprising:
    a transfer film to which said pattern is removably attached; and
    a positioner for aiding in the positioning of the pattern relative to the substrate, the positioner including a second member mounted directly integral with the transfer film, said second member including at least one second magnet and one fourth magnet and a first member mounted integrally with a support for receiving the substrate, or with a press for pressing against the substrate the transfer film and the pattern attached to the transfer film, said first member including at least one first magnet and one third magnet, said first and second magnets being designed to mutually magnetically attract one another when said first and second members are brought into correspondence, and said first and fourth magnets or said second and third magnets being designed to mutually repel each other when said first and second members are brought into correspondence, such that said first and second members interact with one another such that a connection is established between said first and second members when said first and second members are brought into correspondence with each other, the connection preventing them from moving away from each other, the second member being designed to remain mounted directly integral with the transfer film after transfer of the pattern from the transfer film to the substrate.

* * * * *